US012722933B2

United States Patent
(12) United States Patent
Frey et al.

(10) Patent No.: US 12,722,933 B2
(45) Date of Patent: Sep. 1, 2026

(54) METHOD FOR PROVIDING COMPONENT INFORMATION AT A TEXTILE MACHINE COMPONENT, AND TEXTILE MACHINE COMPONENT

(71) Applicant: Saurer Spinning Solutions Gmbh & Co. KG, Übach-Palenberg (DE)

(72) Inventors: Peter Frey, Stuttgart (DE); Simon Schaffrin, Remshalden (DE); Sven Wolf, Schwäbisch Gmünd (DE)

(73) Assignee: Saurer Spinning Solutions Gmbh & Co. KG, Übach-Palenberg (DE)

( * ) Notice: Subject to any disclaimer, the term of this patent is extended or adjusted under 35 U.S.C. 154(b) by 268 days.

(21) Appl. No.: 18/555,656

(22) PCT Filed: Apr. 7, 2022

(86) PCT No.: PCT/EP2022/059257

§ 371 (c)(1),
(2) Date: Oct. 16, 2023

(87) PCT Pub. No.: WO2022/218814

PCT Pub. Date: Oct. 20, 2022

(65) Prior Publication Data

US 2024/0190681 A1 Jun. 13, 2024

(30) Foreign Application Priority Data

Apr. 15, 2021 (DE) ......................... 102021109428.3

(51) Int. Cl.
*B65H 75/18* (2006.01)
*D01H 7/04* (2006.01)
(Continued)

(52) U.S. Cl.
CPC ............. *B65H 75/182* (2013.01); *D01H 7/04* (2013.01); *G09F 3/02* (2013.01); *G09F 3/0291* (2013.01);
(Continued)

(58) Field of Classification Search
CPC ........................................................ D01H 7/04
See application file for complete search history.

(56) References Cited

U.S. PATENT DOCUMENTS 2,912,815 A * 11/1959 Feather .................... D01H 1/02 57/74
3,092,954 A * 6/1963 Terpak ..................... D01H 7/08 57/130

(Continued)

FOREIGN PATENT DOCUMENTS

DE 2454721 A1 5/1976
DE 2725708 A1 12/1978

(Continued)

OTHER PUBLICATIONS

Search Report issued in corresponding German Application No. 10 2021 109 428.3, dated Jan. 20, 2022 (7 pages).

(Continued)

*Primary Examiner* — Bao-Thieu L Nguyen
(74) *Attorney, Agent, or Firm* — FLYNN THIEL, P.C.

(57) ABSTRACT

A textile machine component and to a method for providing component information at the textile machine component, in particular at a spindle arrangement for spinning or twisting machines. In order to ensure permanent and reliable provision of component information at a plastic-coated textile machine component, provision is made for the textile machine component to be enclosed at least in sections by a heat-shrinkable plastic enclosure that provides the component information, the enclosure being shrunk onto the textile (Continued)

machine component. In order to provide a plastic-coated textile machine component, in particular a spindle arrangement, with component information that can be acquired reliably, provision is made for a plastic enclosure that provides component information to be shrunk onto at least a section of the textile machine component.

16 Claims, 1 Drawing Sheet

(51) Int. Cl.
*G09F 3/00* (2006.01)
*G09F 3/02* (2006.01)

(52) U.S. Cl.
CPC ........ *G09F 3/0297* (2013.01); *B65H 2701/31* (2013.01); *G09F 2003/0251* (2013.01)

(56) References Cited

U.S. PATENT DOCUMENTS

| | | | | | |
|---|---|---|---|---|---|
| 3,577,723 | A * | 5/1971 | Page | D01H 7/16 | 242/597.5 |
| 3,720,568 | A * | 3/1973 | Rowland | A47C 7/285 | 297/452.64 |
| 4,838,019 | A * | 6/1989 | Ueda | D01H 9/187 | 57/264 |
| 6,009,700 | A * | 1/2000 | Wassenhoven | D01H 13/14 | 57/263 |
| 6,195,976 | B1 * | 3/2001 | Wassenhoven | D01H 4/10 | 57/414 |
| 6,205,761 | B1 * | 3/2001 | Wassenhoven | D01H 4/10 | 57/414 |
| 6,321,522 | B1 * | 11/2001 | Landolt | D01H 4/10 | 57/414 |
| 7,287,721 | B2 | 10/2007 | Quick et al. | | |
| 8,001,759 | B2 * | 8/2011 | Wassenhoven | D01H 1/16 | 57/264 |
| 8,801,663 | B2 | 8/2014 | Woehr | | |
| 2003/0070414 | A1 * | 4/2003 | Pohn | D01H 4/10 | 57/404 |
| 2005/0237200 | A1 * | 10/2005 | Bellum | B31C 3/00 | 235/492 |
| 2007/0018825 | A1 * | 1/2007 | Morbitzer | B65C 3/02 | 340/572.1 |
| 2008/0035781 | A1 * | 2/2008 | Pellengo Gatti | B65H 19/2276 | 242/590 |
| 2014/0285046 | A1 * | 9/2014 | Moravec | F16C 32/04 | 310/90.5 |
| 2015/0307245 | A1 * | 10/2015 | Puccini | G01K 1/022 | 702/130 |
| 2024/0150941 | A1 * | 5/2024 | Keuter | D01H 13/32 | |

FOREIGN PATENT DOCUMENTS

| | | | |
|---|---|---|---|
| DE | 19618436 | A1 | 11/1997 |
| DE | 19848080 | A1 | 4/2000 |
| DE | 10324356 | A1 | 1/2005 |
| DE | 102008018502 | A1 | 10/2009 |
| DE | 102008025085 | A1 | 12/2009 |
| DE | 202009009119 | U1 | 2/2010 |
| EP | 2388502 | A2 | 11/2011 |
| WO | 96/19334 | A1 | 6/1996 |

OTHER PUBLICATIONS

International Search Report for International Application No. PCT/EP2022/059257 dated Jul. 7, 2022.

* cited by examiner

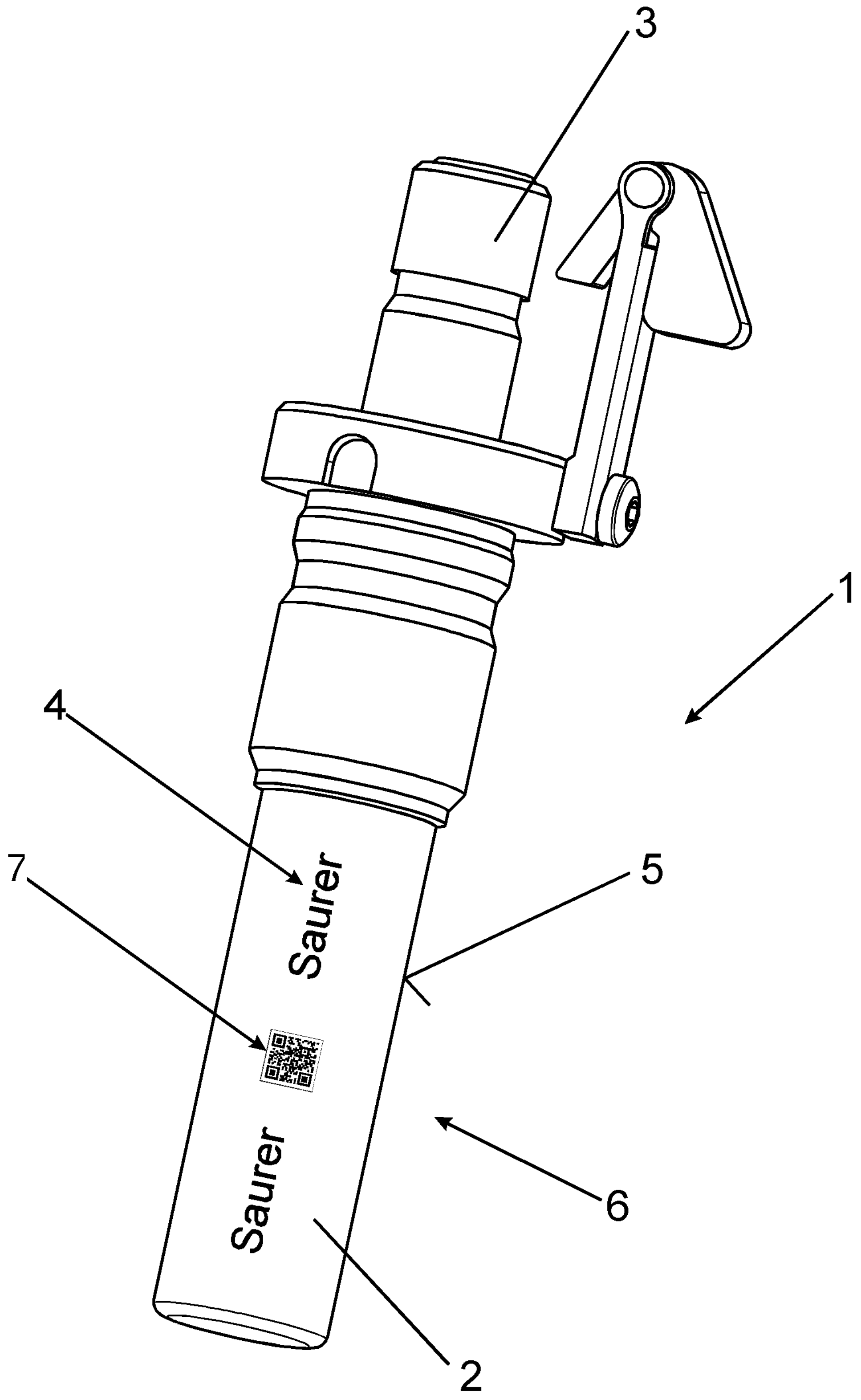
3
1
4
7
5
6
2
Saurer
Saurer

METHOD FOR PROVIDING COMPONENT INFORMATION AT A TEXTILE MACHINE COMPONENT, AND TEXTILE MACHINE COMPONENT

The invention relates to a textile machine component, more particularly a spindle assembly having a spindle and a bearing housing, and to a method for providing component information at a textile machine component, more particularly on a spindle assembly for spinning or twisting machines, said spindle assembly having a spindle and a bearing housing.

Marking textile machine components with component information, for example in the form of a serial number or lot number, is already well known. The serial number can be used to retrieve information about the textile machine component in question stored in a corresponding database, this information being additional component information such as the place of manufacture, the time of manufacture, the material origin, the material composition and/or the material qualities of the component. In the case of, for example, an unforeseen defect or unexpectedly high wear leading to shorter usage times than expected, the access to this information allows possible causes resulting from the production process of the textile machine component to be identified. Besides the arrangement of serial numbers and/or lot numbers as component information, which provide specific information about the components only indirectly, namely by the use of a corresponding database, the textile machine component can also be provided directly with additional component information, such as the manufacturer, the intended use or maintenance cycles, allowing the observer to learn this information directly, i.e. without consulting a database. The component information can be applied, for example, by means of appropriate engravings or overprints on the textile machine component, for example on an outer surface of a bearing housing of a spindle assembly.

Environmental influences during the storing of the textile machine components and mechanical influences during the operation of the textile machine components can make the component information indiscernible for the operating personnel. The illegibility can result from corrosion or wear of the textile machine components; corrosive influences can already affect the textile machine components during storage.

It is already known that, in order to protect stressed components, the components can be provided with shrinkable plastic sheaths which are applied to the surface of the components in a thermal shrinkage process. By the use of plastic sheaths which are shrunk on, as known e.g. from WO 96/19334, which discloses the basic use of sleeves, films or tubes which can be shrunk on and which are used, for example, on cables or pipes as a thermally and chemically resistant covering, protection of the machine components from external influences, e.g. surface-corroding influences, is achieved, but the covering also makes it impossible for the operating personnel to capture the component information applied to the machine components.

Proceeding therefrom, the present invention addresses the problem of providing a method which ensures that component information is permanently and reliably provided on a plastic-covered textile machine component, more particularly a spindle assembly for spindle machines or twisting machines. Furthermore, the present invention addresses the problem of providing a plastic-covered textile machine component, more particularly a spindle assembly, having component information which can be reliably captured.

The method according to the present invention allows component information to be reliably provided. Component information includes product-specific information, such as the material origin of the textile machine component, its material composition and/or material qualities in parts or overall, the manufacturing process of the textile machine component or of individual component portions, the production data such as production place, production time and manufacturer, and operation data, service life, maintenance cycles or the like, which are relevant, inter alia, to a subsequent machining and processing procedure or to the use of the component. The component information can be in the form of character strings, such as numerals, letters or character combinations, in the form of a code, such as a barcode, or in the form of a stored code, e.g. in an RFID chip or in a magnetic element.

In the present application, providing the component information on the textile machine component is understood to mean arranging the component information in such a way that it can be captured, more particularly read off, by the operating personnel reliably, i.e. even after the action of damaging influences, for example. For this purpose, according to the present invention, the textile machine component, more particularly the bearing housing of the spindle assembly, is at least partly sheathed with a heat-shrinkable plastic sheath, which provides the component information and which is shrunk onto the textile machine component, more particularly onto the outer surface of the bearing housing. According to the present invention, the plastic sheath is designed such that it protects the textile machine component from external influences, more particularly corrosive influences, while at the same time allowing the component information to be captured, by virtue of the fact that the plastic sheath itself has the component information and/or by virtue of the fact that the plastic sheath is designed such that it allows the component information arranged on the textile machine component to be captured after the plastic sheath has been shrunk on. The component information can be captured preferably by the operating personnel and/or by a capturing unit.

The method according to the present invention thus makes it possible to provide textile machine components, more particularly spindle assemblies of spinning or twisting machines, which are reliably protected from external influences, more particularly corrosive influences, by the use of a plastic sheath which has been shrunk on. At the same time, the suitability of the plastic sheath for providing the component information offers reliable capturing of, for example, data relevant to operation, such as the usage conditions of the corresponding textile machine components, more particularly spindle assemblies, which usage conditions should be observed for the further use of the textile machine component, more particularly the spindle assembly. The plastic sheath is therefore used both to protect the surface of the textile machine components and to reliably provide the component information for the operating personnel.

For this purpose, according to a particularly advantageous embodiment of the present invention, the component information is arranged on the textile machine component, more particularly on the outer surface of the bearing housing, and subsequently the plastic sheath is shrunk on such that the plastic sheath covers the component information, the plastic sheath being designed in such a way and being shrunk on in such a way that external capturing, more particularly sensor-based or optical capturing, of the component information can be accomplished by means of a capturing unit and/or by the operating personnel.

According to this embodiment of the present invention, component information arranged on the textile machine component, more particularly on the outer surface of a bearing housing of a spindle assembly, is covered by the plastic sheath in such a way that the component information subsequently can be captured, more particularly can be read off optically. The method according to this further development of the present invention allows the component information to be arranged on the textile machine components directly in the manufacturing process of the textile machine components. Because a suitable plastic sheath is used, which, when shrunk on, allows the component information to be externally captured, more particularly optically, additional steps for marking the textile machine components with component information are rendered unnecessary. Overall, the component information can thus be provided on the textile machine component particularly easily and economically when a plastic sheath which can be shrunk on is used.

Particularly advantageously, a plastic sheath which is transparent in the region of the component information when shrunk on is shrunk onto the textile machine component, more particularly onto the outer surface of the bearing housing. The use of such a plastic sheath allows the operating personnel or a capturing unit to particularly easily capture, i.e. read out or read off, the component information by sensor-based capture and/or optically, while the plastic sheath reliably protects the component information arranged on the textile machine component from influences, more particularly corrosive influences, that would destroy the component information. In particular, the use of a plastic sheath which, when shrunk on, is transparent or at least semitransparent at least in the region of the component information ensures that the component information can be captured particularly easily and quickly. Furthermore, the semitransparent region of the plastic sheath can preferably be coloured. Alternatively or additionally, the plastic sheath can be coloured outside of the transparent or semitransparent region and preferably can be coloured the same as or differently than the semitransparent region. For example, components for different intended uses can be marked by colour so that they can be readily distinguished from each other. Particularly for components of similar or identical shape, the ability to distinguish the components in such a way is advantageous.

In addition to or as an alternative to the arrangement of the component information on the textile machine component, according to a further embodiment of the present invention the component information is arranged on the plastic sheath, more particularly on the outer surface of the plastic sheath.

The arrangement of the component information on the plastic sheath renders complex methods for applying the component information to the textile machine component, e.g. by means of engraving, unnecessary. The component information can be easily applied to the plastic sheath before or after the plastic sheath is shrunk onto the textile machine component. The arrangement of the component information on the plastic sheath also allows non-transparent plastic sheaths, more particularly coloured plastic sheaths, to be used, so that the plastic sheaths themselves can also be used for marking and in particular for distinguishing the textile machine components or for marketing purposes. The component information can be applied to the plastic sheath by means of, for example, economical printing methods, wherein resistant printing inks are preferably used. Different component types can thus be easily optically marked and distinguished from each other by the use of printing inks assigned to respective component types.

According to a particularly advantageous embodiment of the present invention, it is also provided that the component information is applied, in machine-readable form, to the textile machine component, more particularly the outer surface of the bearing housing and/or the plastic sheath. In this embodiment of the present invention, the component information is provided not in the form of plain text, but rather in coded form, e.g. in the form of a barcode, QR code, an RFID chip which can be read out, or a magnetically coded element, which can be read out by means of suitable reading devices and provides the corresponding component information, more particularly in plain text or to a control unit, in accordance with the coding. The use of machine-readable codes allows the component information to be arranged on the textile machine component particularly easily and compactly. The component information can be applied directly to the textile machine component and/or to the plastic sheath, for example by means of printing, or can be arranged, for example, on stickers, which are adhesively attached to the textile machine component or to the plastic sheath.

The plastic sheath is applied to the textile machine component in a known way in suitable systems, the plastic sheath first being arranged on the textile machine component or at least on a portion of the textile machine component. Subsequently, the plastic sheath is heated in a specified way by means of a suitable heat treatment, whereby the plastic sheath constricts and is thus shrunk onto the textile machine component, so that afterwards the plastic sheath is in contact with the surface of the textile machine component.

According to an advantageous further development of the method according to the present invention, the plastic sheath is tubular and/or the textile machine component is heated in the region of connection to the plastic sheath before the plastic sheath is shrunk on.

The tubular design of the plastic sheath allows the plastic sheath to be particularly easily arranged on the textile machine component, the plastic sheath being placed over the textile machine component before the heat treatment. Subsequently, the plastic sheath is shrunk onto the textile machine component by a suitable application of heat. A tubular design ensures that the plastic sheath is particularly evenly arranged after having been shrunk on. Prior heating of the textile machine component, at least in the region of connection to the plastic sheath, ensures a particularly good connection of the plastic sheath to the textile machine component.

The textile machine component according to the present invention, more particularly the spindle assembly for spindle machines or twisting machines, said spindle assembly having a spindle and a bearing housing, is characterised in that a plastic sheath providing component information is shrunk onto at least a portion of the textile machine component, more particularly onto at least a portion of the outer surface of the bearing housing.

The textile machine component according to the present invention is characterised in that, by means of the plastic sheath, the textile machine component is reliably protected, in the region connected to the plastic sheath, from external influences, more particularly corrosive influences, which could cause damage to the surface of the textile machine component and destruction of component information arranged thereon. At the same time, as a result of the plastic sheath being designed to provide the component information, the reliable capture of the component information by the operating personnel is ensured, even after damaging influences have acted on the textile machine component. According to the present invention, the plastic sheath is designed to provide the component information, for which purpose the plastic sheath itself is provided with the component information and/or is designed for the providing of the component information, i.e. for the capturing of the component information arranged on the textile machine component by the operating personnel.

According to a particularly advantageous embodiment of the present invention, if the component information is arranged on the textile machine component, more particularly on the outer surface of the bearing housing of a spindle assembly, the shrunk-on plastic sheath is designed such that it allows the component information to be externally captured, more particularly optically, by the operating personnel. For this purpose, the plastic sheath, when shrunk on, is particularly advantageously transparent at least in the region of the component information, so that the component information can be particularly easily read off by the operating personnel.

Alternatively or additionally, according to a further embodiment of the present invention the component information is arranged on the shrunk-on plastic sheath, more particularly on the outer surface of the plastic sheath. In this embodiment of the invention, the plastic sheath has component information, which is embedded into the plastic sheath and more particularly is arranged on the outer surface of the plastic sheath, the component information particularly preferably being printed onto or adhesively attached to the plastic sheath, where the component information can be well captured by the operating personnel or by a capturing unit. The use of the plastic sheath as the carrier of the component information allows the component information to be particularly easily provided in such a way that the component information can be well captured, more particularly optically or machine-readably, for example by the printing of the component information using a suitable printing ink for high contrast in comparison with the colouring selected for the plastic sheath. The colouring of the plastic sheath can also be used for marking and/or distinguishing the textile machine components and/or for marketing purposes.

According to a particularly advantageous embodiment of the present invention, it is also provided that the component information is machine-readable. For machine-readability, the component information is, for example, coded in the form of a barcode or QR code or provided by means of an RFID chip or a magnetically coded element, the component information being captured by means of suitable reading devices and displayed on the reading device and/or transmitted by the reading device to corresponding processing units, such as control, evaluation and/or display units. The use of machine-readable codes allows particularly varied component information to be provided in a limited area on the textile machine component in such a way that the component information can be read out.

In principle, the design of the plastic sheath for arranging on the textile machine component can be freely selected. According to a particularly advantageous embodiment, however, the plastic sheath is tubular. This embodiment of the present invention ensures particularly easy and economical arrangement on the textile machine component, more particularly on a cylindrical bearing housing of a spindle assembly. Furthermore, the use of a tubular plastic sheath ensures that the plastic sheath is evenly arranged on the surface of the textile machine component, more particularly on the surface of the bearing housing, after the heat treatment in which the plastic sheath is shrunk onto the surface of the textile machine component.

An embodiment example of the present invention is explained below with reference to a drawing. In the drawing:

FIG. 1 shows a perspective view of a spindle assembly with a plastic sheath arranged on a bearing housing.

FIG. 1 shows, as an embodiment example of a textile machine component, a spindle assembly 1 for a spinning or twisting machine in a perspective view. The spindle assembly 1 has a bearing housing 6, which is used to arrange the spindle assembly 1 on a spindle rail (not shown here) of the spinning or twisting machine and to rotatably support a spindle 3, onto which a bobbin can be placed during the operation of the spinning or twisting machine.

The bearing housing 6 has, on the outside thereof, a coaxially arranged tubular plastic sheath 2, which, after being coaxially arranged on the bearing housing 6, is shrunk onto the bearing housing 6, for which purpose the textile machine component, together with the plastic sheath 2 arranged thereon, is subjected to a suitable heat treatment. First component information 4 in the form of the name of the manufacturer and second component information 7 in the form of a QR code are printed onto the outside surface 5 of the plastic sheath 2. The QR code comprises product-specific information of the textile machine component, such as the material origin, the material composition, the material qualities, information regarding the manufacturing process of individual component portions, the production data such as the production place and the production time, and operating data, the service life, and maintenance cycles. The printing was accomplished by means of a suitable printing apparatus following the heat treatment.

LIST OF REFERENCE SIGNS

1 Spindle assembly
2 Plastic sheath
3 Spindle
4 First component information
5 Surface (plastic sheath)
6 Bearing housing
7 Second component information

The invention claimed is:

1. A method for providing component information at a textile machine component, the method comprising:

at least partially sheathing the textile machine component with a heat-shrinkable plastic sheath; and providing the textile machine component with the component information;

wherein at least partially sheathing includes shrinking the heat-shrinkable plastic sheath onto the textile machine component, and wherein the component information is visible through a transparent section of the heat-shrinkable plastic sheath.

2. The method according to claim 1, wherein providing the textile machine component with the component information includes arranging the component information on the textile machine component, and subsequently performing the step of shrinking the heat-shrinkable plastic sheath such that the heat-shrinkable plastic sheath covers the component information, the heat-shrinkable plastic sheath being designed such that the component information can be externally captured.

3. The method according to claim 1, wherein a region of the heat-shrinkable plastic sheath outside of the transparent section is coloured.

4. The method according to claim 1, wherein the component information is applied, in machine-readable form, to the textile machine component.

5. The method according to claim 1, wherein the heat-shrinkable plastic sheath is tubular and/or the textile machine component is heated in the region of connection to the heat-shrinkable plastic sheath before the step of shrinking the heat-shrinkable plastic sheath.

6. The method according to claim 1, wherein the textile machine component comprises a spindle assembly for spinning or twisting machines, the spindle assembly having a spindle and a bearing housing, the step of at least partially sheathing the textile machine component includes at least partially sheathing the bearing housing of the spindle assembly, and the step of shrinking includes shrinking the heat-shrinkable plastic sheath onto an outer surface of the bearing housing.

7. A textile machine component comprising:
- a spindle assembly for spinning or twisting machines, said spindle assembly having a spindle and a bearing housing; and
- a plastic sheath, which provides visible component information and which is shrunk onto at least a portion of the textile machine component.

8. The textile machine component according to claim 7, wherein the component information is arranged on the textile machine component, and the shrunk-on plastic sheath is designed such that the component information can be externally captured.

9. The textile machine component according to claim 8, wherein the component information is arranged on the outer surface of the bearing housing.

10. The textile machine component according to claim 7, wherein a transparent section of the shrunk-on plastic sheath is in a region of the component information, with a region of the plastic sheath outside of the transparent region being coloured.

11. The textile machine component according to claim 7, wherein the component information is machine readable.

12. The textile machine component according to claim 7, wherein the plastic sheath is tubular.

13. The textile machine component according to claim 7, wherein the plastic sheath is shrunk onto at least a portion of an outer surface of the bearing housing.

14. The textile machine component according to claim 7, wherein the component information is arranged on an outer surface of the plastic sheath.

15. A method for providing component information at a textile machine component, the method comprising:
- at least partially sheathing the textile machine component with a heat-shrinkable plastic sheath; and
- providing the textile machine component having the heat-shrinkable plastic sheath at least partially sheathed thereon with the component information;
- wherein at least partially sheathing includes shrinking the heat-shrinkable plastic sheath onto the textile machine component such that an exterior shape of the heat-shrinkable plastic sheath is substantially identical to an exterior shape of the textile machine component.

16. The method according to claim 15, wherein the component information is arranged on the heat-shrinkable plastic sheath.

* * * * *